United States Patent [19]

Asahara et al.

[11] Patent Number: 5,339,353
[45] Date of Patent: Aug. 16, 1994

[54] MOBILE COMMUNICATION SYSTEM

[75] Inventors: Masaru Asahara; Takuro Oguchi; Shunroku Sasaki, all of Kawasaki, Japan

[73] Assignee: Fujitsu Limited, Kawasaki, Japan

[21] Appl. No.: 847,705

[22] Filed: Mar. 5, 1992

[30] Foreign Application Priority Data

Mar. 6, 1991 [JP] Japan ................................. 3-39677
Mar. 19, 1991 [JP] Japan ................................. 3-54720
Mar. 19, 1991 [JP] Japan ................................. 3-54722

[51] Int. Cl.$^5$ ...................... H04M 11/00; H04B 1/00
[52] U.S. Cl. ........................................ 379/59; 379/58; 379/61; 379/63; 455/54.1; 455/56.1
[58] Field of Search ................ 379/58, 59, 61, 63; 455/33.1, 54.1, 56.1

[56] References Cited

U.S. PATENT DOCUMENTS

| | | | |
|---|---|---|---|
| 4,792,984 | 12/1988 | Matsuo | 455/56.1 |
| 4,796,291 | 1/1989 | Makino | 455/56.1 |
| 4,876,738 | 10/1989 | Selby | 379/59 |
| 5,157,661 | 10/1992 | Kanai et al. | 455/33.1 |

FOREIGN PATENT DOCUMENTS 8400651 2/1984 PCT Int'l Appl. .
8505240 11/1985 PCT Int'l Appl. .

OTHER PUBLICATIONS

IEEE International Conference on Communication, vol. 4, Apr. 1990, Atlanta, U.S., pp. 1351–1357, Hattori et al.
"Personal Communication Concept and Architecture".
IEEE International Conference on Communication, vol. 1, Apr. 1990, Atlanta, U.S., pp. 228–232, Balasubramanya et al. "Universal Personal Telecommunications".

Primary Examiner—Stephen Chin
Assistant Examiner—Vijay Shankar

[57] ABSTRACT

A mobile communication system includes an exchange, a plurality of radio base stations coupled to the exchange, and a plurality of mobile stations. The exchange includes a device for obtaining receivable periods of the mobile stations, which are continuously maintained in a call receivable state during the receivable periods, a device for determining whether the mobile stations are busy and a decision device which sequentially sends call signals to the mobile stations to determine whether or not each of the stations responds to a call signal. The results of determination by the decision device are recorded in a recording device.

17 Claims, 12 Drawing Sheets

FIG. 4

| MOBILE STATION ID | TIME 1 | TIME 2 | TIME 3 | TIME 4 | TIME 5 | TIME 6 |
|---|---|---|---|---|---|---|
| XXXXX | 1 | 1 | 1 | 0 | 0 | 0 |
| YYYYY | 0 | 0 | 0 | 0 | 1 | 1 |

FIG. 5

| | |
|---|---|
| MOBILE STATION ID  XXXXX | (1, TIME 1) (0, TIME 4) (1, TIME 37) |
| MOBILE STATION ID  YYYYY | (0, TIME 1) (1, TIME 5) (0, TIME 9) |

| MAIL NO. | RECEIPT NO | SEND TIME | DESTINATION PID | MARK | RADIO CONNECTION TIME | ACKNOWLEDGEMENT TIME |
|---|---|---|---|---|---|---|
| | | | | | | |
| | | | | | | |

MOBILE COMMUNICATION SYSTEM

BACKGROUND OF THE INVENTION (1) Field of the Invention

The present invention generally relates to mobile communication systems, and more particularly to a mobile communication system having new communication services.

(2) Background of the Invention

FIG. 1 shows a conventional mobile communication system, which is composed of a line control/switching connection apparatus 10, radio base stations 12-1–12-n, and mobile stations 20-1–20-n. For example, when the mobile station 20-1 generates a call, a radio communication channel is established between the mobile station 20-1 and the radio base station closet to the mobile station 20-1. The established ratio communication channel is coupled, via the line control/switching connection apparatus 10, to the radio base station closet to the destination mobile station.

SUMMARY OF THE INVENTION

A general object of the present invention is to provide a novel and useful value-added mobile communication system having new communication services.

A more specific object of the present invention is to provide a mobile communication system having a function of monitoring a call receivable period during which each mobile station is maintained in a call receivable state.

The above objects of the present invention are achieved by a mobile communication system comprising: an exchange; a plurality of radio base stations coupled to the exchange; and a plurality of mobile stations, wherein the exchange comprises first means for obtaining receivable periods of the mobile stations, which are continuously maintained in a call receivable state during the receivable periods.

Another object of the present invention is to provide a mobile communication system having a function of determining whether or not each mobile station has duly received information.

This object of the present invention is achieved by a mobile communication system comprising: an exchange; a plurality of radio base stations coupled to the exchange; a plurality of mobile stations; first means for sequentially sending call signals to the mobile stations via the radio base stations; second means, provided in each of the mobile stations, for sending an acknowledgement signal to the first means when one of the call signals has been duly received; third means, operatively coupled to the first means and the second means, for determining whether or not the acknowledgement signal has been sent back from each of the mobile station; and fourth means, coupled to the third means, for recording determination results obtained by the third means.

BRIEF DESCRIPTION OF THE DRAWINGS

Other objects, features and advantages of the present invention will become more apparent from the following detailed description when read in conjunction with the accompanying drawings, in which:

FIG. 4 is a diagram of a first format for recording information by a recording unit shown in FIG. 2;

FIG. 5 is a diagram of a second format for recording information by the recording unit shown in FIG. 2;

DESCRIPTION OF THE PREFERRED EMBODIMENTS

Figure 1:
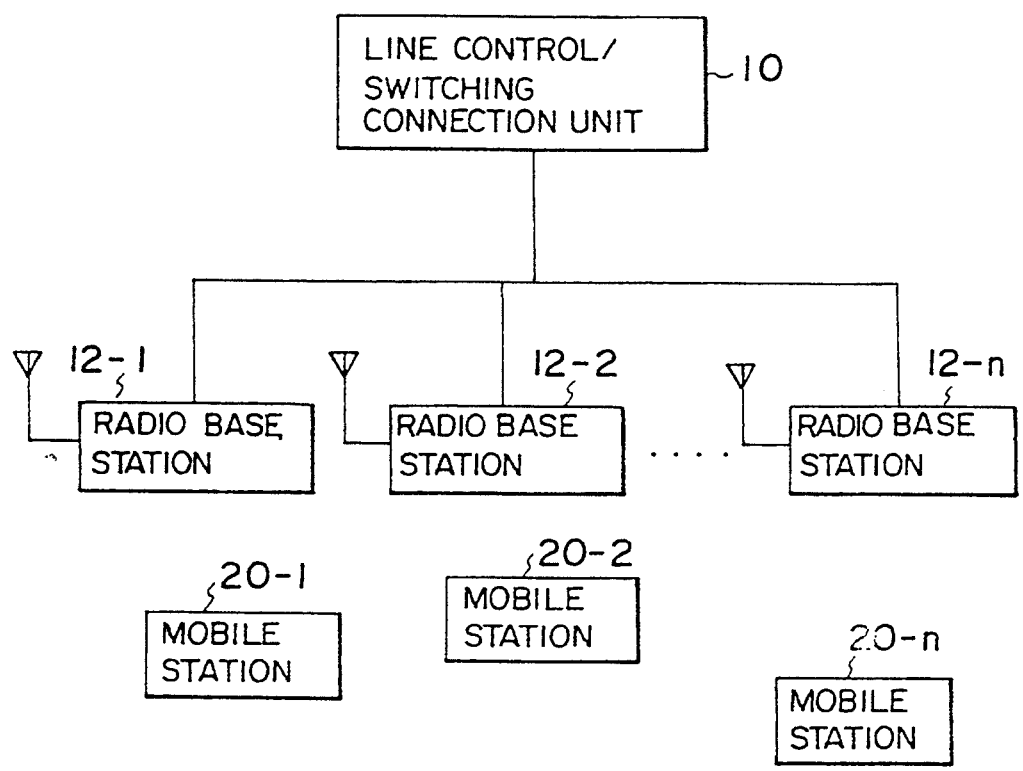
FIG. 1 is a block diagram of a conventional mobile communication system.
Figure 2:
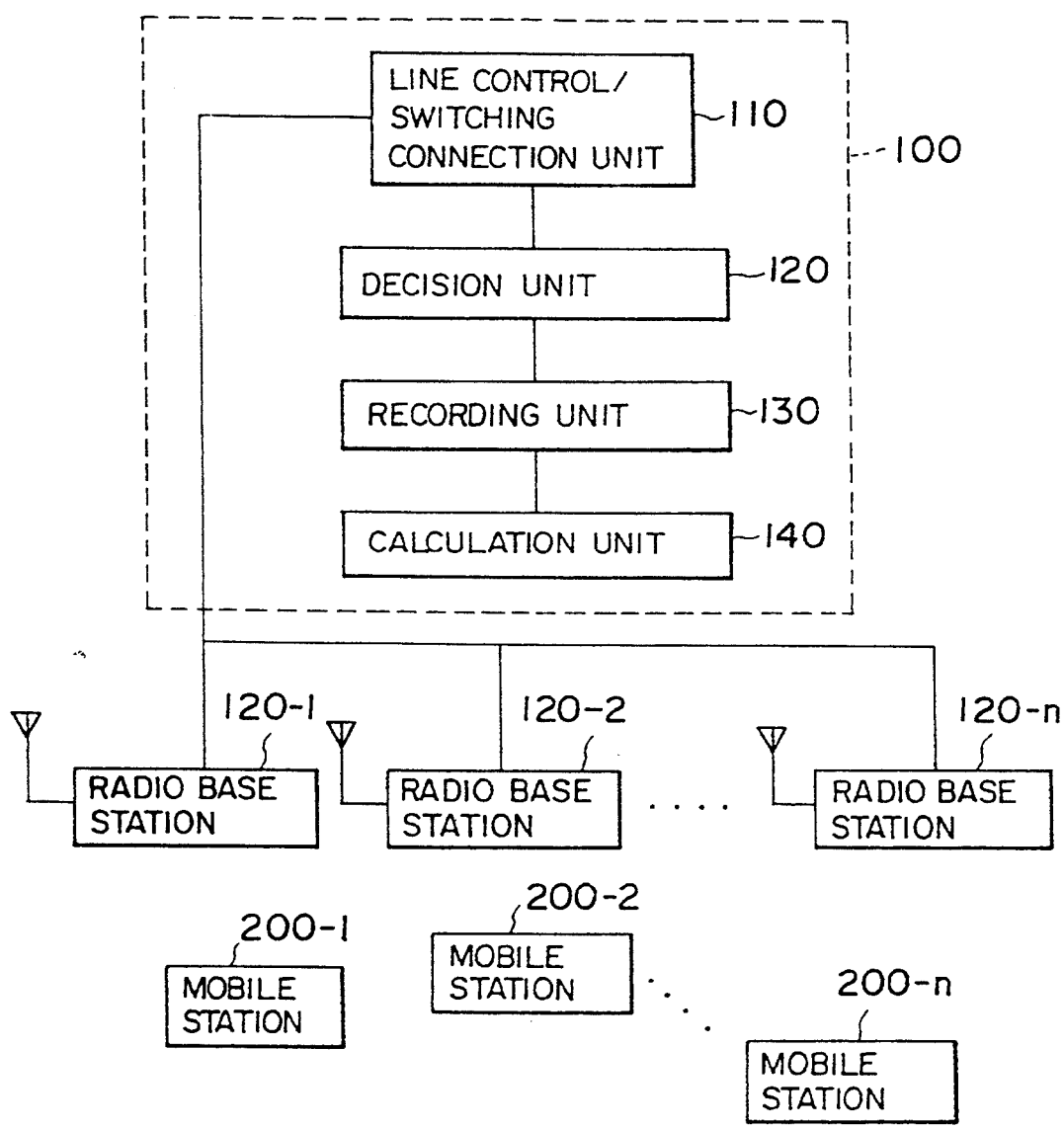
FIG. 2 is a block diagram showing an outline of a mobile communication system according to a first embodiment of the present invention.

FIG. 2 shows a first embodiment of the present invention. A mobile communication system shown in FIG. 2 is composed of an exchange 100, radio base stations 120-1–120-n, and mobile stations 200-1–200-n. The exchange 100 includes a line control/switching connection unit 110, a decision unit 120 for determining whether or not each of the mobile stations 200-1–200-n is continuously maintained in a call receivable state, a recording unit 130 and a calculation unit 140.

The decision unit 120 determines whether or not each of the mobile stations 200-1–200-n is continuously maintained in the receivable state by one of the following three procedures. According to the first decision procedure, the decision unit 120 sends call signals to the mobile stations 200-1–200-n and checks whether or not response signals have been received from the mobile stations 200-1–200-n. If each mobile station is not continuously maintained in the receivable state, it will not send the response signal to the exchange 100.

According to the second decision procedure, the decision unit 120 determines whether or not the mobile stations 200-1–200-n are busy. The decision unit 120 determines that each station which is determined to be busy is continuously maintained in the receivable state. The decision unit 120 sends the call signal to each mobile station which is not determined to be busy, and discerns whether or not the response signal has been returned therefrom. If each mobile station is not continuously maintained in the receivable state, it will not send the response signal to the exchange 100.

According to the third decision procedure, the mobile stations 200-1–200-n spontaneously respectively send calls to the exchange 100 at predetermined times or predetermined intervals. The calls are received by the radio base stations 120-1–120-n and transferred to the decision unit 120.

The recording unit 130 records the time when the above decision procedure is carried out and the results of the decision procedure. For each of the mobile stations 120-1–120-n, the calculation unit 140 calculates, from the results recorded on the recording unit 130, the period during which each mobile station is continuously maintained in the receivable state. For example, if the mobile station 200-1 is continuously maintained in the receivable state during a period between time t1 and t5, this information is recorded on the recording unit 130, and the calculation unit 140 calculates the period between time t1 and t5.

Figure 3:
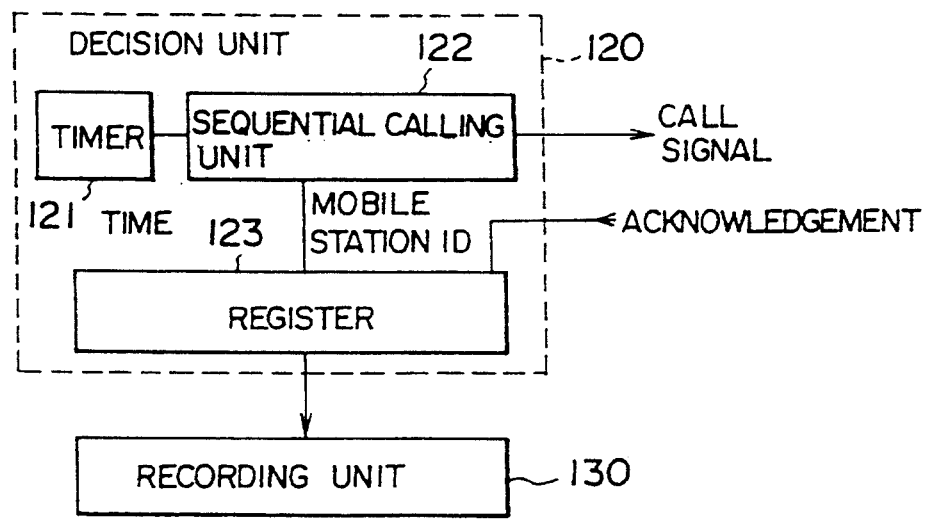
FIG. 3 is a block diagram of a first embodiment of a decision unit shown in FIG. 2.

FIG. 3 shows a structure of the decision unit which implements the above first decision procedure. The decision unit 120 is composed of a timer 121, a sequentially calling unit 122 for sequentially calling the mobile stations 200-1–200-n, and a register 123. The timer 121 generates a decision instruction at predetermined times or predetermined intervals. The decision instruction activates the sequentially calling unit 122. The time at which the timer 121 generates the decision instruction is written into the register 123. Each time the decision signal is generated, the sequentially calling unit 122 generates a sequential call signal to one of the mobile stations 200-1–200-n and writes into the register 123 a mobile station identification number of the mobile station to which the sequential call signal is sent. The register 123 stores an information set including the decision time, the mobile station identification number and data showing whether or not the corresponding mobile station is maintained in the receivable state. The contents of the register 123 are transferred to the recording unit 130. In this manner, the information sets related to all the mobile stations 200-1–200-n are recorded on the recording unit 130.

FIG. 4 shows a recording format for recording the information sets on the recording unit 130. As shown in FIG. 4, the recording unit 130 has a table, which shows, for each mobile station, whether or not it was maintained in the receivable state at the respective decision times. Numeral "1" shows that the mobile station was maintained in the receivable state, and a numeral "0" shows that the mobile station was not maintained in the receivable state.

FIG. 5 shows another recording format for recording the information sets on the recording unit 130. As shown in FIG. 5, a plurality of information sets (x, y). such as (1, time 1) and (0, time 4) are recorded for each mobile station identification number. Information "x" shows whether or not the corresponding mobile station was maintained in the receivable state. Information "y" shows the decision time at which the decision procedure was carried out.

Figure 6:
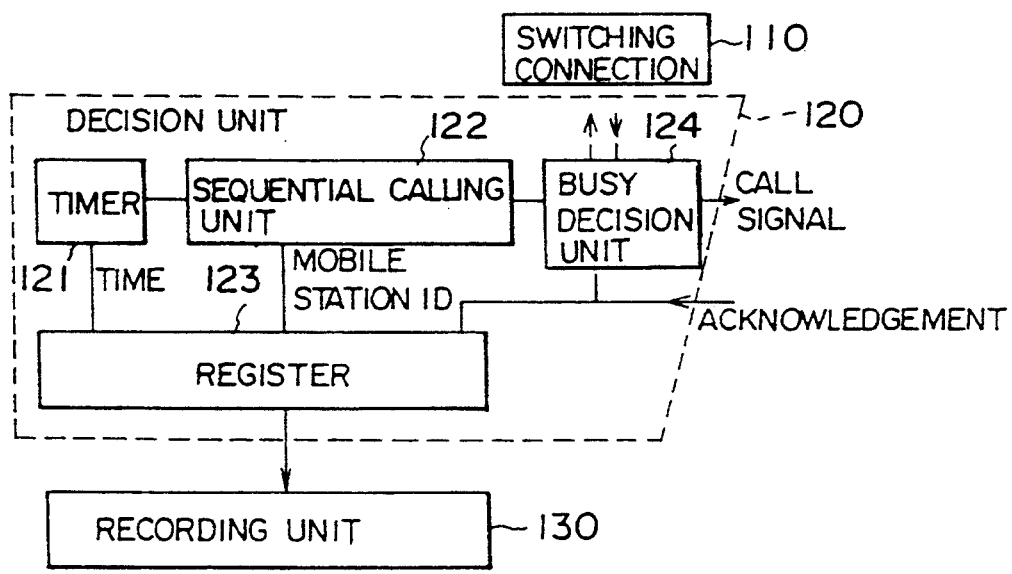
FIG. 6 is a block diagram of a second embodiment of the decision unit shown in FIG. 2.

FIG. 6 shows a structure which implements the aforementioned second decision procedure. In FIG. 6, parts which are the same as those shown in FIG. 3 are given the same reference numerals. The decision unit 120 shown in FIG. 6 is obtained by adding a busy decision unit 124 to the structure shown in FIG. 3. Before the sequential call signal is sent to a mobile station, the busy decision unit 124 determines, by referring to the line connection/switching connection unit 110, whether or not the above mobile station is busy. When it is determined that the mobile station is busy, the decision unit 120 determines that the mobile station is maintained in the receivable state. On the other hand, when it is determined that the mobile station is not busy, the sequential call signal is set to the mobile station as in the case of the first decision procedure.

Figure 7:
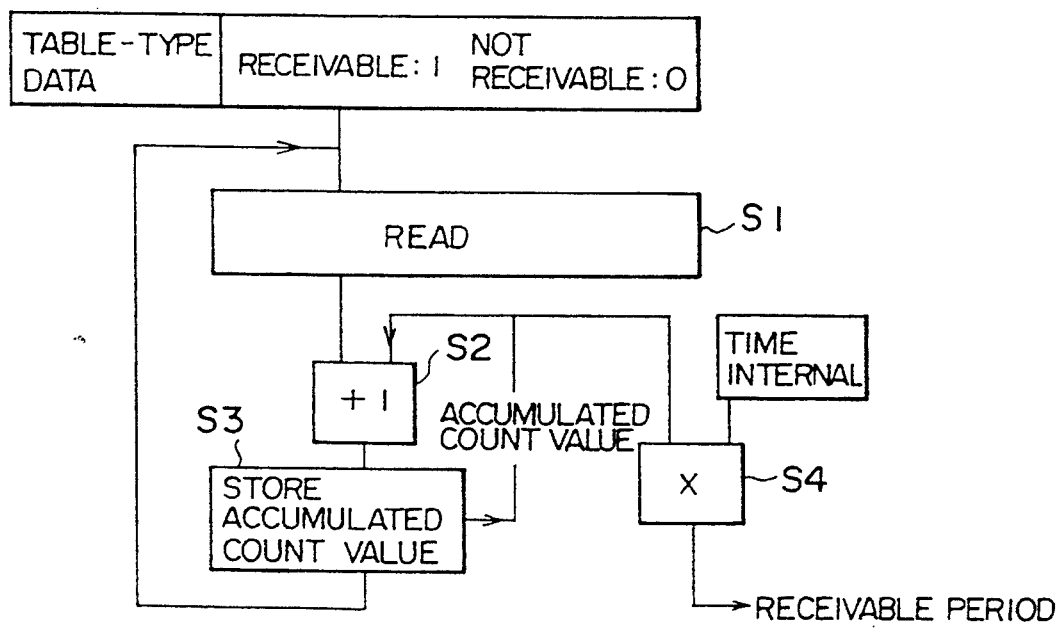
FIG. 7 is a flowchart showing a first operation of a calculation unit shown in FIG. 2.

FIG. 7 shows a flowchart of an accumulating process executed by the calculation unit 140. The accumulating process shown in FIG. 7 uses information stored in the format shown in FIG. 4, and obtains the receivable period therefrom. In step S1, the calculation unit 140 reads out information related to the mobile station, the receivable period of which will now be calculated. In step S2, the calculation unit 140 adds 1 to an accumulated count value when "1" is read out from the recording unit 130. The incremented count value is stored in step S3. A sequence consisting of the steps S1–S3 is repeatedly carried out until all information about the mobile station being considered has been read out from the recording unit 130. In this manner, the sum total of "1" can be obtained. In step S4, the sum total is multiplied by a predetermined interval at which the above-mentioned decision signal is repeatedly generated. In this manner, the receivable period of the mobile station being considered can be obtained.

Figure 8:
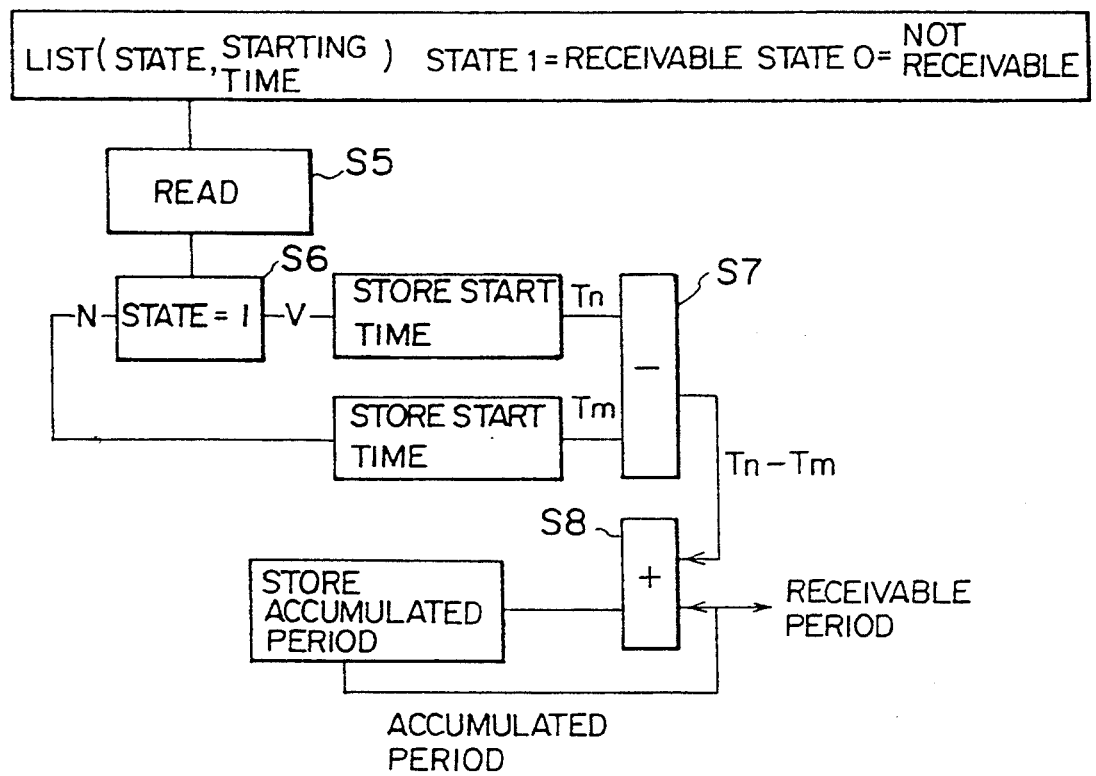
FIG. 8 is a flowchart showing a second operation of the calculation unit shown in FIG. 2.

FIG. 8 is a flowchart of another accumulating process executed by the calculation unit 140. The accumulating process shown in FIG. 8 uses the information recorded in the format shown in FIG. 5, and calculates the receivable period therefrom. In step S5, the calculation unit 140 reads out the information about the mobile station, the receivable period of which will now be calculated. In step S6, the calculation unit 140 determines whether or not the data showing the state of the mobile station is equal to "1". When the result of this determination is affirmative, the calculation unit 140 stores the decision time as a starting time Tn. When it is determined, in step S6, that the above data is equal to "0", the calculation unit 140 stores the decision time as a starting time Tm. In step S7, the calculation unit 140 calculates the difference between Tn and Tm when the time Tm is obtained. In step S8, the calculation unit 140 adds the above time difference to an accumulating period. The receivable period is equal to the accumulating period obtained when all information about the mobile station being considered has been read out from the recording unit 130.

By dividing the receivable period obtained in the above manner by the total time, it becomes possible to obtain a rate of the receivable period to the total time. It is possible to provide an acoustic or optical notification unit which generates an indication when the receivable period has become greater than a predetermined period.

The first embodiment of the present invention can be applied to a salary calculation system in which the receivable period of each mobile station is used as a working time of a person who carries the mobile station and a salary of that person is calculated by multiplying time charge to the receivable period.

Figure 9:
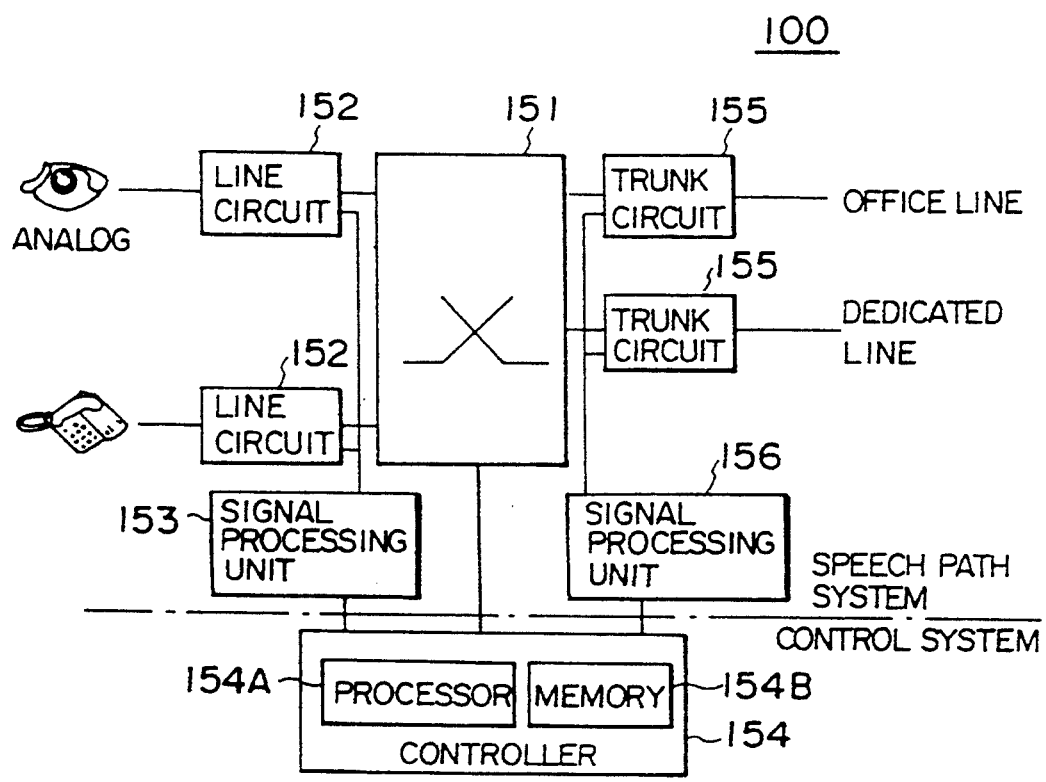
FIG. 9 is a block diagram of an exchange shown in FIG. 2.

FIG. 9 is a block diagram of the exchange 100 shown in FIG. 2. As shown in FIG. 9, the exchange 100 is composed of a speech path switch 151, line circuits 152, signal processing units 153 and 156, a controller 154 and trunk circuits 155. The controller 154 is composed of a processor 154A and a memory 154B. The line circuits 152 are connected to, for example, an analog telephone set and a digital telephone set. The line circuits 152 are controlled by the signal processing unit 153 under the control of the controller 154. The trunk circuits 155 are connected to, for example, an office line and a dedicated line 156. The trunks 155 are controlled by the signal processing unit 156 under the control of the controller 156. The processor 154 controls the entire operation of the exchange 100. The line control/switching connection unit 110 shown in FIG. 2 is composed of the speech path switch 151, the line circuits 152, the signal processing units 153 and 156, and the trunk circuits 155. The receivable-state decision unit 120, the recording unit 130 and the calculation unit 140 shown in FIG. 2 are implemented by the controller 154.

Figure 10:
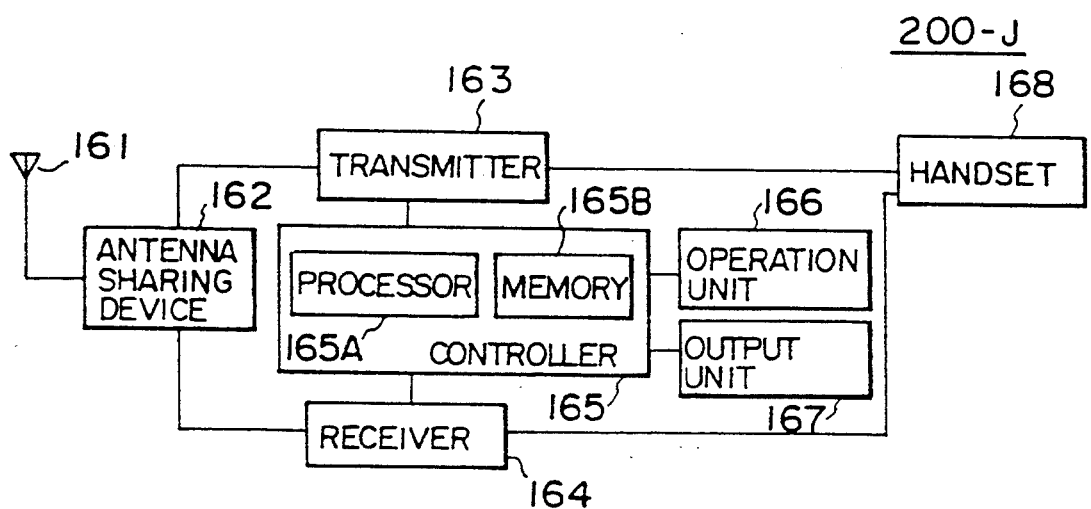
FIG. 10 is a block diagram of each mobile station shown in FIG. 2.

FIG. 10 shows an embodiment of the mobile station 200-j (j=1, 2, ..., n). The mobile station shown in FIG. 10 is a portable telephone set. The mobile station is composed of an antenna 161, an antenna sharing device 162, a transmitter unit 163, a receiver unit 164, a controller 165, an operation unit 166, an output (display) unit 167 and a handset 168. The controller 165 is composed of a processor 165A and a memory 165B. The controller 165 controls the entire operation of the mobile station. The operation unit 166 includes a power switch, a ten key, an on-hook key, an off-hook key, a volume adjustment key and so on. The output unit 167 includes a power ON-OFF indication, an electric field strength indication and a telephone number indication.

Figure 11:
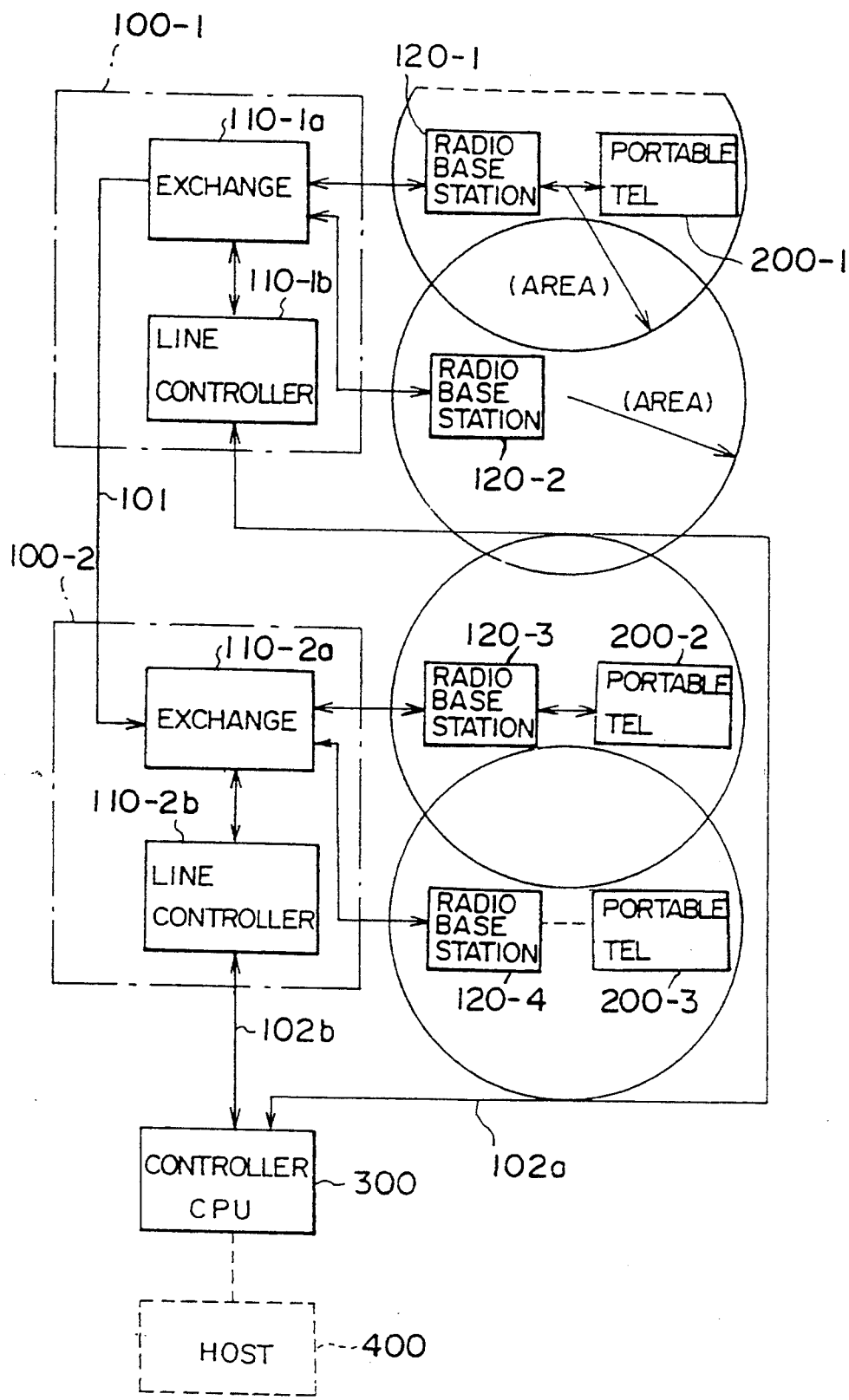
FIG. 11 is a block diagram of an embodiment of the mobile communication system of the present invention.

FIG. 11 is a portable telephone system including exchanges and mobile stations (portable telephone sets) as has been described previously. The system shown in FIG. 11 includes two exchanges 100-1 and 100-2, an information processor unit or controller (CPU) 300, a plurality of radio base stations (only the radio base stations 120-1–120-4 are shown), and a plurality of portable telephone sets (only the portable telephone sets 200-1–200-3 are shown). A host computer 400 may be connected to the controller 300 if necessary. Each of the exchanges 100-1 and 100-2 is configured as shown in FIG. 2 or FIG. 9. For the sake of simplicity, only a switch 110-1a and a line controller 110-1b are illustrated in FIG. 11, and only a switch 110-2a and a line controller 100-2b are illustrated therein. The switch 110-1a and 110-2a are connected to each other through a communication line 101. The line controller 110-1b is controlled by the controller 300 via a communication line 102a, and the line controller 110-2b is controlled by the controller 300 via a communication line 102b. A network may be provided in the communication lines 101, 102a and/or 102b.

The radio base stations 120-1 and 120-2 are connected to the switch 110-1a, and the radio base stations 120-3 and 120-4 are connected to the switch 110-2a. Each of the radio base stations 120-1–120-4 has respective service areas as shown in FIG. 11. The portable telephone sets 200-1–200-3 are assigned respective personal identification numbers (PID). Each of the portable telephone sets 200-1–200-3 is registered in either the line controller 110-1b or 110-2b. Each of the line controllers 110-1b and 110-2b manages the service area in which each related telephone set is located, and determines whether each related telephone set is busy or not. Each line controller further manages accounting information.

Each portable telephone set can communicate with the other party via the exchanges 100-1 and 100-2 and the radio base stations even if it is located in any of the service areas. For example, if the portable telephone set 200-1 is located in the service area of the radio base station 120-1 and the portable telephone set 200-3 is called, this call is transferred to the line controller 110-1b via the radio base station 120-1 and the switch 110-1a. Then, the line controller 110-1b makes a connection between the switch 110-1a and 110-2a. The line controller 110-2b makes a connection between the switch 110-2a and the called portable telephone set 200-3 via the ground station 120-3. During this communication, the controller 110-1b manages accounting information about this communication.

It is possible to register, in the exchange 100-2, the identification number of the portable telephone set 200-1 or its user which is originally registered in the exchange 100-1. Alternatively, it is also possible to inform the exchange 100-1 that the portable telephone set 200-1 will receive communication services in other service areas. With this registration, it becomes possible for the portable telephone set 200-1 to receive the communication services in the service areas of the exchange 100-2. It will now be assumed that the portable telephone set 200-1 is located in the service area presented by the radio base station 120-4 and receives communication services therein. Before the portable telephone set 200-1 is moved to the service area of the radio base station 120-4, it registers its own identification number in the line controller 110-2b via the line controller 100-1b. When the portable telephone set 200-1 in the service zone of the radio base station 120-4 generates a call, the line controller 110-2b recognizes that the portable telephone set 200-1 is originally registered in the line controller 110-1b. Then, the necessary control procedure for making a connection with the portable telephone set 200-1.

There is also possibility that the user of the portable telephone set 200-1 may wish to use the portable telephone set 200-3 owned by another person. In this case, the personal identification number of this user is registered in not only the line controller 110-1b but also 110-2b in the same manner as described above. In this case, it is possible to register, in the line controller 110-2b, a personal identification number which is the same as that originally registered in the line controller 110-b or different therefrom. In this case, the line controller 110-1b has information necessary to determine that the personal identification number different from that originally registered therein indicates the same user.

In the above-mentioned cases, the accounting information about the telephone set or user originally registered in the exchange 100-1 is managed by the line controller 110-1b.

A description will now be given of a second embodiment of the system of the present invention. As will be described below in detail, the second embodiment of the present invention intends to provide a new communication service in a mobile communication system as shown in FIG. 11. More specifically, the second embodiment of the present invention intends to confirm that all the mobile stations located in one or more service areas have duly received information which has been broadcasted or sequentially sent to all the mobile stations. This communication service will create an application in which a sales office needs to pass a message in common to all salesmen managed by the sales office and confirm that all the mobile stations carried by the salesmen have duly received the message.

Figure 12:
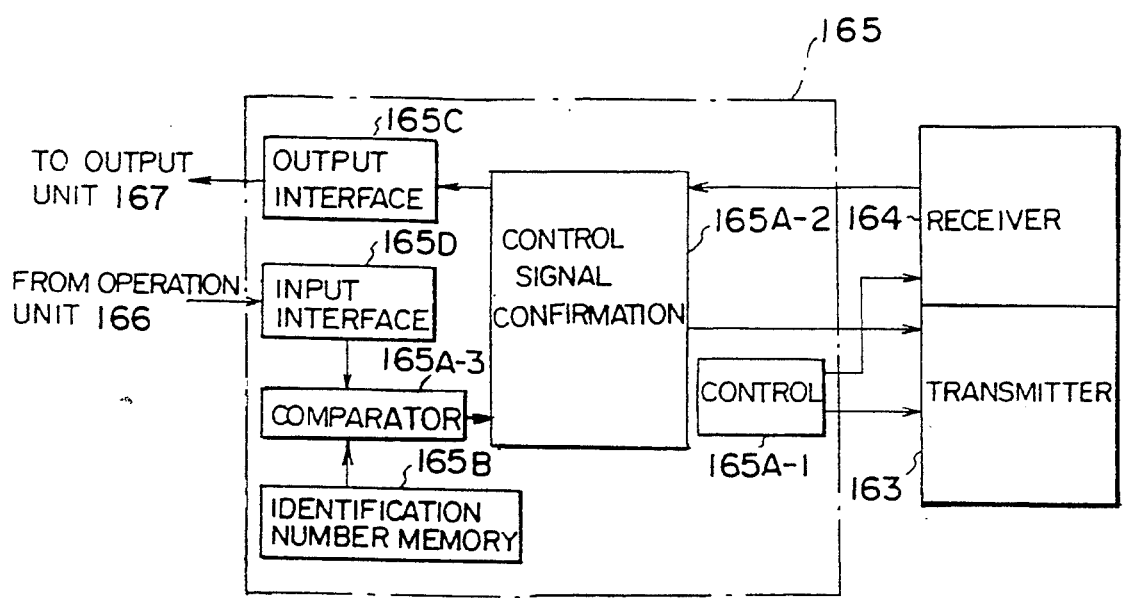
FIG. 12 is a block diagram of an essential part of a mobile station used in a second embodiment of the present invention.

FIG. 12 is a block diagram of an essential part of each mobile station or portable telephone set. In FIG. 12, parts which are the same as those shown in FIG. 10 are given the same reference numerals. The controller 165 shown in FIG. 10 includes a control part 165A-1, a control signal confirmation part 165A-2, a comparator 165A-3, an identification number memory 165B, an output interface 165C and an input interface 165D. The control part 165A-1, the control signal confirmation part 165A-2 and the comparator 165A-3 are included in the processor 165A shown in FIG. 10. The identification number memory 165B is included in the memory 165B shown in FIG. 10. The output interface 165C connects the control signal confirmation part 165A-2 to the output unit 167. The input interface 165D connects the operation unit 166 to the comparator 165A-3.

Figures 13, 14:
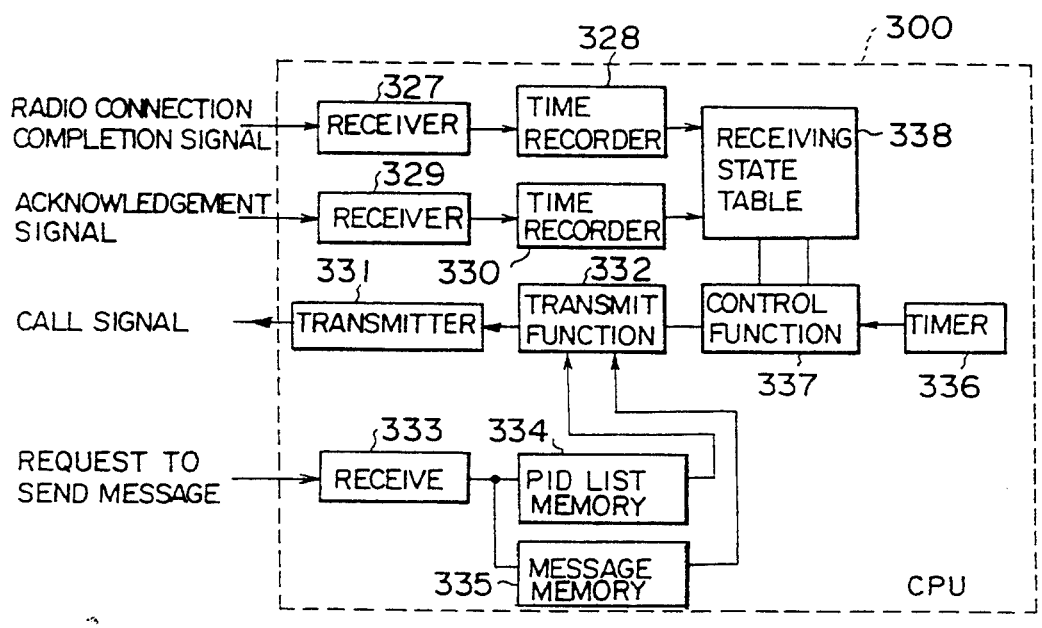
FIG. 13 is a block diagram of a controller shown in FIG. 11.
FIG. 14 is a diagram showing information stored in a receiving state table shown in FIG. 13.

FIG. 13 is a block diagram of the structure of the controller 300 shown in FIG. 11. As shown, the controller 300 includes receivers 327, 329 and 333, a transmitter 331, time recorders 328 and 330, a transmission function unit 332, an PID list memory 334, a message memory 335, a timer 336, a control unit 337 and a receiving state table 338.

The controller 300 shown in FIG. 13 sequentially calls all the portable telephone sets which should be called. In order to realize the sequential calling, the timer 336 periodically instructs the control function unit 337 to activate the transmission function unit 332. If it is requested to send a message by, for example, the host computer 400 shown in FIG. 11; this message is stored in the message memory 335. The message which is to be sent is transferred to the transmission function unit 332. The PID list memory 334 stores the identification numbers of the portable telephone sets which should be called. The contents of the PID list memory 334 are transferred to the transmission function unit 332. The transmission function unit 332 sequentially calls the portable telephone sets via the transmitter 331.

When the portable telephone set shown in FIG. 12 receives a call generated in the above-mentioned manner, the receiver unit 164 informs the control signal confirmation part 165A-2 of receipt of the call which may have the message. The control signal confirmation part 165A-2 informs, via the output interface 165C and the output unit 167, the user or operator of receipt of the call which may have the message. The operator confirms receipt of the call and reads the message displayed on the output unit 167. Then, the operator inputs the identification number by the operation unit 166 in order to acknowledge receipt of the call and message to the controller 300. The input identification number is sent to the comparator 165A-3 via the input interface 165D. Then, the comparator 165A-3 compares the received identification number with the identification number registered in the identification number memory 165B. When both the identification numbers are the same, the control signal confirmation unit 165A-2 controls the transmitter unit 163 so that an acknowledgement signal is sent to the controller 300 shown in FIG. 13.

The acknowledgement signal is applied to the time recorder 330 via the receiver 329. The time when the acknowledgement signal is received is generated by the time recorder 330 and written into the receiving state table 338. Before the time data is written into the receiving state table 338, a radio connection completion signal generated by the radio base station is applied via the receiver 327. If a radio communication channel fails to be established, the radio connection completion signal is not generated. The timer recorder 328 records the time when the radio communication completion signal is received. The time data thus recorded is written into the receiving state table 338. The control function unit 337 checks whether or not the radio connection completion signals of all the personal telephone sets have been received. If it is determined that the radio connection completion signals from some personal telephone sets have not yet been received, the control function unit 337 calls these personal telephone sets again.

The above-mentioned procedure is repeatedly carried out until all the portable telephone sets in the PID list memory 334 have been accessed.

FIG. 14 shows the contents of the receiving state table 338. The receiving state table 338 stores the following information. A mail number is assigned to each call. A receipt number is a sequential number identifying the main number. The transmission time is the time when the control function unit 337 is activated by the timer 336. A destination PID number shows the PID number of each destination telephone set. A mark shows that the radio connection failed or the acknowledgement signal was not received. The radio connection time is recorded by the time recorder 328. The acknowledgement time is recorded by the time recorder 330.

A description will now be given of a third embodiment of the present invention with reference to FIGS. 15 and 16. The third embodiment of the present invention is intended to inform, via a public telephone set, the line controller 110-1b or 110-2b of the current position of the mobile station or portable telephone set. As has been described previously, each portable telephone set which is located outside of the registered service areas can communicate with the other party in the aforementioned manner. The third embodiment of the present invention is concerned with a registration procedure for registering the identification number in a line controller different from the line controller in which the portable telephone set is originally registered.

Figure 15:
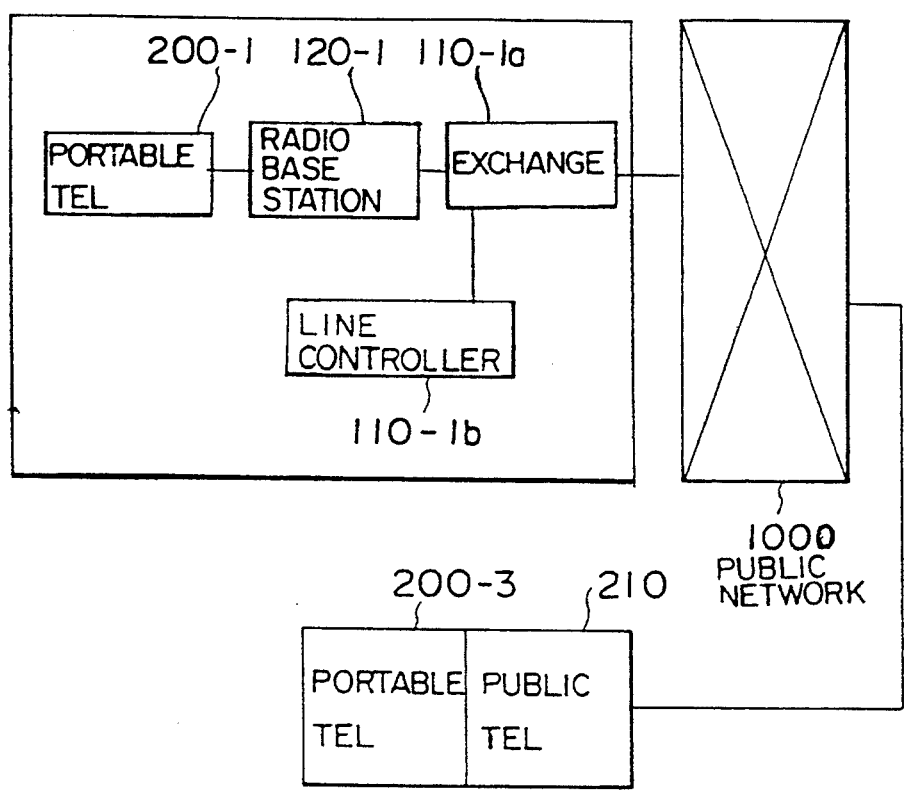
FIG. 15 is a block diagram showing an outline of a third embodiment of the present invention.

FIG. 15 shows how to inform the controller 110-1b of the location of the portable telephone set 200-3. As shown in FIG. 15, the portable telephone set 200-3 is fixed to a public telephone set 210 so that a speaker of the portable telephone set 200-3 faces a microphone (not shown) of the public telephone set 210, which is connected to a public network 1000. The exchange 100-1a, which functions as a private branch exchange, is also connected to the public network 1000.

Figure 16:
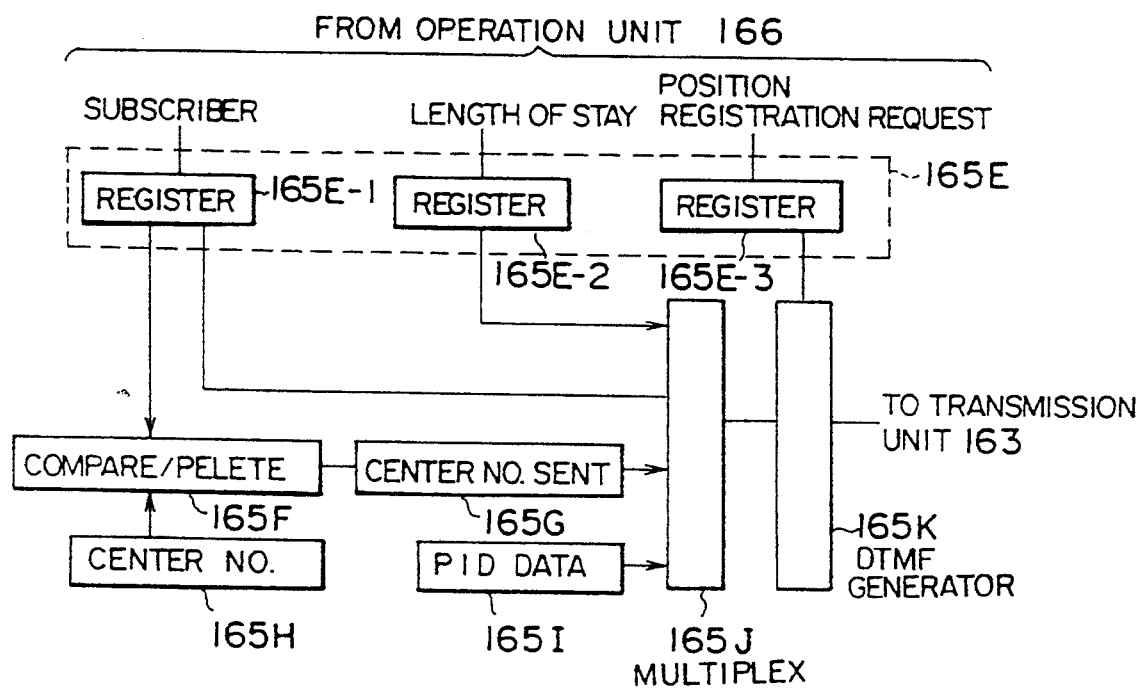
FIG. 16 is a block diagram of an essential part of a mobile station used in the third embodiment of the present invention.

FIG. 16 is a block diagram of an essential part of the portable telephone set used in the third embodiment of the present invention. The structure shown in FIG. 16 is a part of the controller 165 shown in FIG. 10. As shown, the portable telephone set includes a register memory 165E, an area code comparator 165F, a sending center number register 165G, a center number register 165H, a PID number register 165I, a multiplexer 165J and a DTMF (Dual tone Multiple Frequency) generator 165K. The register 165E includes a subscriber number register 165E-1, a length-of-stay register 165E-2 and a position registration request register 165E. The register memory 165E is connected to the operation unit 166 shown in FIG. 10.

The center number register 165H stores a telephone number for calling the line controller 110-1b shown in FIG. 15. The PID number register 165I stores the personal identification number of the portable telephone set 200-3 shown in FIG. 15. The subscriber number register 165E-1 temporarily stores the subscriber number of the public telephone set 210 shown in FIG. 15. The operator inputs the subscriber number by the operation unit 166. The length-of-stay register 165E-2 temporarily stores the length of stay of the operate, which is input by the operation unit 166. For example, time data showing the length of stay is registered in the length-of-stay register 165E-2. The position registration request register 165E temporarily stores a position registration request signal, which is generated by pushing a position registration button of the operation unit 166.

The area code comparator 165F compares the area code of the subscriber number read out from the subscriber register 165E-1 with that of the center number of the center number stored in the register 165H. If both the area codes are the same as each other, the area code comparator 165F deletes the area code from the entire center number. The center number (the area code may be deleted) supplied from the comparator 165F is written into the register 165G. The multiplexer 165J arranges the center number, the subscriber number, the PID number, and the length-of-stay data in this order. A multiplexed (composite) is output to the DTMF generator 165, which generates a corresponding DTMF signal. This DTMF signal is converted into an acoustic signal by the speaker of the handset 168 shown in FIG. 10. The acoustic signal is input to the microphone of the handset of the public telephone set 210 shown in FIG. 15. Then, a corresponding signal is sent to the line controller 110-1b via the public network 1000 and the exchanger 110-1a.

In the above-mentioned manner, it becomes possible to inform, via the public telephone set, the line controller of the current position of the portable telephone set (and the length of stay, where necessary). It is preferable that the operator makes the public telephone set in the off-hook state after inputting the necessary information and pushes the location registration button of the operation unit 166. During this operation, it may be convenient to display the subscriber telephone number and the length of stay on a display panel of the output unit 167. It is also possible to use a dial-pulse type public telephone set instead of the DTMF type public telephone set. In this case, the center number is dialed, and then the position registration button is pushed after the line controller responds to this call.

The present invention is not limited to the specifically disclosed embodiments, and variations and modifications may be made without departing from the scope of the present invention.

What is claimed is:

1. A mobile communication system for controlling communication of a plurality of mobile stations with radio channels, comprising:
   decision means for sequentially sending call signals to said mobile stations and for determining whether or not each of the mobile stations is maintained in a call receivable state by determining whether or not each of the mobile stations responds to one of said call signals;
   recording means, coupled to said decision means, for recording determination results obtained by said decision means and times when decisions are made; and
   receivable period calculating means, coupled to said recording means, for calculating the receivable periods of said mobile stations on the basis of the determination results and said times.

2. A mobile communication system for controlling communication of a plurality of mobile stations with radio channels, comprising:
   determining means for determining whether or not the mobile stations are busy;
   decision means, coupled to said determining means, for sequentially sending call signals to idle mobile stations which are determined to be idle and for determining whether or not each of the idle mobile stations is maintained in a call receivable state by determining whether or not each of the idle mobile stations responds to one of said call signals;
   recording means, coupled to said decision means, for recording determination results obtained by said decision means, first times when decisions are made, and second times when said determining means determines that the mobile stations are not busy; and
   receivable period calculating means, coupled to said recording means, for calculating the receivable periods of said mobile stations on the basis of the determination results and said first and second times.

3. A mobile communications system comprising:
   an exchange;
   a plurality of radio base stations coupled to said exchange; and
   a plurality of mobile stations,
   wherein said exchange comprises means for obtaining receivable periods of said mobile stations, which are continuously maintained in a call receivable state during the receivable periods, wherein:
   each of said mobile stations comprises generating means for spontaneously sending a call signals to said exchange; and
   wherein said obtaining means of the exchange comprises:
   decision means for determining whether or not each of the mobile stations is maintained in a call receivable state by determining whether or not said call signal generated by each of the mobile stations has been received;
   recording means, coupled to said decision means, for recording determination results obtained by said decision means and times when decisions are made; and
   receivable period calculating means, coupled to said recording means, for calculating the receivable periods of said mobile stations on the basis of the determination results and said times.

4. A mobile communication system as claimed in claim 1, wherein said mobile communication system further comprises means for generating a receivable-period rate of the receivable period to a predetermined total time in each of said mobile stations.

5. A mobile communication system comprising:
   an exchange;
   a plurality of radio base stations coupled to said exchange; and
   a plurality of mobile stations,
   wherein said exchange comprises means for obtaining receivable periods of said mobile stations, which are continuously maintained in a call receivable state during the receivable periods, wherein:
   said mobile communication system comprises a public telephone set;
   each of said mobile stations comprises a DTMF signals generating means for generating a DTMF signal indicating an identification number assigned to each of the mobile stations and used for calling a corresponding one of the mobile stations; and
   said DTMF signal of one of said mobile stations is transmitted to said exchange via said public telephone set to which said one of the mobile stations is connected and the identification number represented by said DTMF signal is registered in said exchange.

6. A mobile communication system as claimed in claim 5, wherein:
said mobile communication system has a plurality of service areas;
each of the mobile stations is originally registered in one of the service areas;
said DTMF signal includes information showing a length of stay of said one of the mobile stations which is located in one of the service areas different from one of the service areas in which said one of the mobile stations is originally registered; and
said DTMF signal is transmitted to said exchange via said public telephone set and said length of stay is registered in said exchange.

7. A mobile communication system for controlling communication of a plurality of mobile stations with radio channels, the system comprising:
sending means for sequentially sending call signals to said mobile stations;
receiving means for receiving from said mobile stations an acknowledgement signal indicating that one of said call signals has been duly received;
determining means, operatively coupled to said sending means and said receiving means, for determining whether or not said acknowledgement signal has been sent back from each of said mobile stations; and
recording means, coupled to said determining means, for receiving from said determining means results of determining whether or not the acknowledgement signal is received from each of the mobile stations and recording said results to determine the states of the mobile stations.

8. A mobile communication system as claimed in claim 7, and further comprising:
an exchange;
adding means, coupled to said sending means, for adding a message to one of said call signals which are sequentially sent to said mobile stations by said first means; wherein:
each of said mobile stations comprises display means for displaying said message; and
said receiving means provided in each of said mobile stations comprises confirmation means for making said acknowledgement signal sent to said exchange after a user confirms said message displayed by said display means.

9. A mobile communication system as claimed in claim 8, wherein said confirmation means comprises:
input means for inputting an identification number of each of said mobile stations; and
comparator means for comparing said identification number with a predetermined identification number, said acknowledgement signal being sent to said exchange when said identification number input by said input means is the same as said predetermined identification number.

10. A mobile communication system as claimed in claim 7, and further comprising:
means for determining whether or not a radio connection between said exchange and each of said mobile stations has been made; and
means for making said sending means send the call signals again to mobile stations which are determined as failing to make radio connections.

11. A mobile communication system as claimed in claim 7, wherein said sending means periodically sends the call signals to said mobile stations via radio base stations.

12. A mobile communication system as claimed in claim 7, wherein:
said mobile communication system has a plurality of service areas; and
said sending means sequentially sends the call signals to the mobile stations within each of the service areas.

13. A mobile communication system as claimed in claim 7, wherein:
said mobile communication system comprises a public telephone set;
each of said mobile stations comprises DTMF signal generating means for generating a DTMF signal indicating an identification number assigned to each of the mobile stations and used for calling a corresponding one of the mobile stations; and
said DTMF signal of one of said mobile stations is transmitted to an exchange via said public telephone set to which said one of the mobile stations is connected, and the identification number represented by said DTMF signal is registered in said exchange.

14. A mobile communication system comprising:
an exchange;
a plurality of radio base stations coupled to said exchange;
a plurality of mobile stations;
a public telephone set connected to said exchange;
each of said mobile stations comprises DTMF signal generating means for generating a DTMF signal indicating an identification number assigned to each of the mobile stations and used for calling a corresponding one of the mobile stations; and
said DTMF signal of one of said mobile stations is transmitted to said exchange via said public telephone set to which said one of the mobile stations is connected, and the identification number represented by said DTMF signal is registered in said exchange.

15. A mobile communication system as claimed in claim 1, wherein said mobile stations are portable telephone sets.

16. A mobile communication system as claimed in claim 7, wherein said mobile stations are portable telephone sets.

17. A mobile communication system as claimed in claim 14, wherein said mobile stations are portable telephone sets.

* * * * *